United States Patent
Li et al.

(10) Patent No.: US 8,122,049 B2
(45) Date of Patent: Feb. 21, 2012

(54) ADVERTISING SERVICE BASED ON CONTENT AND USER LOG MINING

(75) Inventors: Li Li, Issaquah, WA (US); Tarek Najm, Kirkland, WA (US); Ying Li, Bellevue, WA (US); Zheng Chen, Beijing (CN); Hua-Jun Zeng, Beijing (CN); Ke Tang, Beijing (CN); Zhifeng Yang, Beijing (CN); FengPing Zeng, Beijing (CN); Xianfang Wang, Beijing (CN); Xiaofeng Dai, Redmond, WA (US); Benyu Zhang, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 119 days.

(21) Appl. No.: 11/378,323

(22) Filed: Mar. 20, 2006

(65) Prior Publication Data

US 2007/0219955 A1    Sep. 20, 2007

(51) Int. Cl.
*G06F 7/00*     (2006.01)
*G06F 17/30*    (2006.01)
*G06Q 30/00*    (2006.01)

(52) U.S. Cl. ........................ 707/769; 705/14.4
(58) Field of Classification Search .............. 707/3, 769; 705/14
See application file for complete search history.

(56) References Cited

U.S. PATENT DOCUMENTS

| | | | | |
|---|---|---|---|---|
| 7,051,020 | B2 * | 5/2006 | Dettinger et al. | 707/4 |
| 2002/0099605 | A1 * | 7/2002 | Weitzman et al. | 705/14 |
| 2003/0055816 | A1 * | 3/2003 | Paine et al. | 707/3 |
| 2004/0138956 | A1 * | 7/2004 | Main et al. | 705/22 |
| 2005/0080775 | A1 * | 4/2005 | Colledge et al. | 707/3 |
| 2005/0160002 | A1 * | 7/2005 | Roetter et al. | 705/14 |
| 2005/0222989 | A1 * | 10/2005 | Haveliwala et al. | 707/3 |
| 2005/0256766 | A1 * | 11/2005 | Garcia et al. | 705/14 |
| 2006/0026067 | A1 * | 2/2006 | Nicholas et al. | 705/14 |
| 2006/0178934 | A1 * | 8/2006 | Besmertinik et al. | 705/14 |
| 2006/0195361 | A1 * | 8/2006 | Rosenberg | 705/14 |
| 2006/0212350 | A1 * | 9/2006 | Ellis et al. | 705/14 |
| 2007/0061301 | A1 * | 3/2007 | Ramer et al. | 707/3 |
| 2007/0100690 | A1 * | 5/2007 | Hopkins | 705/14 |

* cited by examiner

*Primary Examiner* — Pierre Vital
*Assistant Examiner* — Sabana Rahman
(74) *Attorney, Agent, or Firm* — Shook, Hardy & Bacon L.L.P.

(57) ABSTRACT

A system and method are disclosed for providing documents related to a search request. The search request may include a search query of one or more keywords, or the search request may be a demographic search query including one or more demographic attributes. An index containing data crawled from publisher's websites, demographic information of registered users, along with the search history of the registered users can be created. Once a search request is received, the search request can be compared to the information stored in the index, and one or more documents related to the request can be provided.

8 Claims, 4 Drawing Sheets

ADVERTISING SERVICE BASED ON CONTENT AND USER LOG MINING

CROSS-REFERENCE TO RELATED APPLICATION

Not applicable.

STATEMENT REGARDING FEDERALLY SPONSORED RESEARCH OR DEVELOPMENT

Not applicable.

BACKGROUND

In the field of online advertising, determining which web pages to place advertisements can be an important decision. It can be desirable to place advertisements on a web page that a specific target market frequently visits, or on a web page that is related to the marketed produce. Accordingly, it may be desirable for an online advertiser to have knowledge of the types of web pages that a specific target market frequently visits before the advertiser bids for or purchases the rights to advertise on a particular web page. Conventionally, advertisers have to rely on their instincts as to which web pages are related to their product or which web pages their target market frequently visits. It may be more desirable, however, to provide a more precise way in which advertisers can rely on statistical information that details the web pages that their target markets frequently visit and the web pages that keywords related to their products are likely to be found. Such statistical information can be based on tracking the searching habits of a certain population of web users, and can aide an online advertiser in placing their advertisements on web pages with a greater effect.

SUMMARY

A system and method are disclosed for providing documents related to a search request. The documents that are provided may be based on the searching habits of registered users. The demographic attributes of the registered users can be associated with their search history and stored in an index. When a search request is received, the search request can be compared to the information stored in the index. One or more documents that have been previously accessed by a registered user and that is associated with a search request can be provided.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The invention introduces a system and method for providing documents as search results related to a search request. The search request can include a demographic search query including one or more demographic attributes, or the search request can include a search query of one or more keywords. The documents provided that are related to the search request can be based on the searching habits of registered users of a searching service or a content manager. In the event that the search request is a search query including one or more keywords, demographic attributes of the registered users who access the provided documents can also be provided. The documents in the search results list can be provided in a variety of order preferences including sorting the documents by relevance to a keywords or sorting the documents by the popularity of the documents. Once a first list of documents is originally provided, the list can be subsequently reordered by selecting another order preference.

Figure 1:
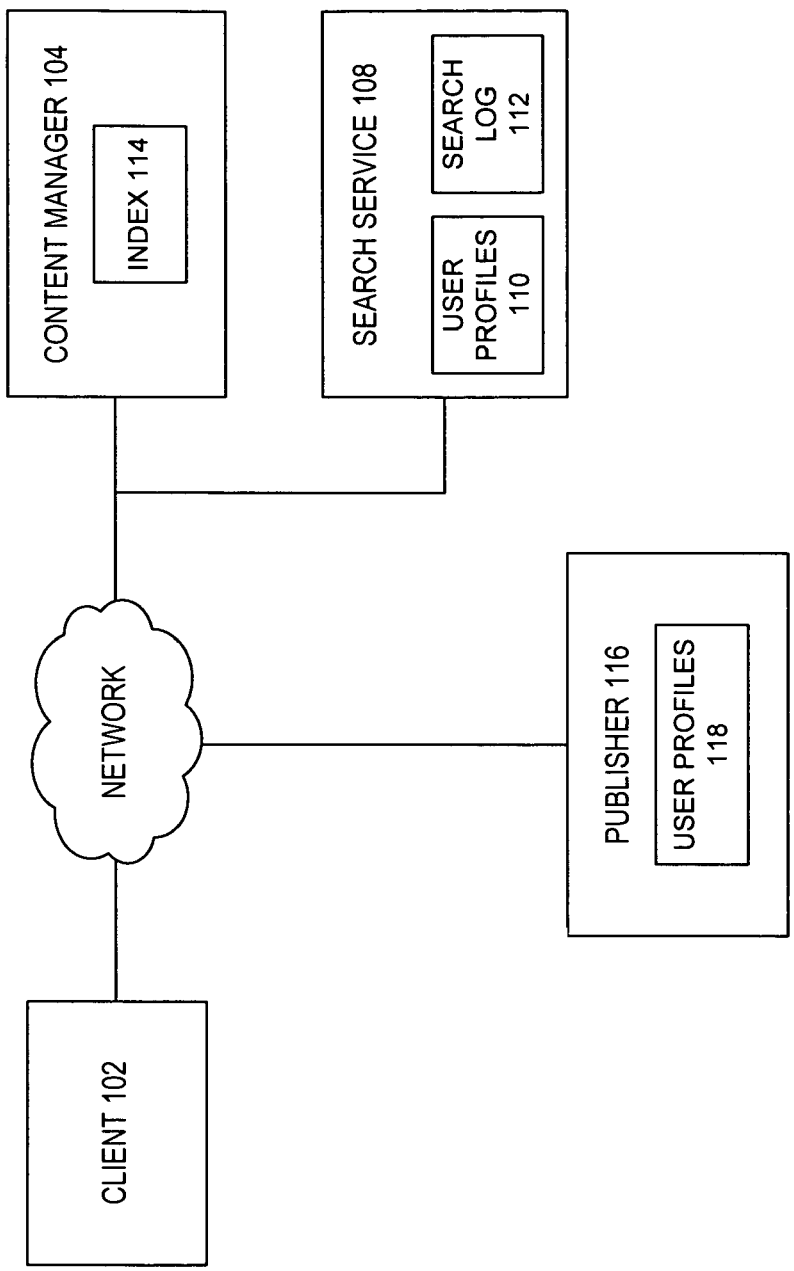
FIG. 1 illustrates an embodiment of a system for implementing the invention.

FIG. 1 illustrates an embodiment of a system for implementing the invention. Client 102 may be or include a desktop or laptop computer, a network-enabled cellular telephone (with or without media capturing/playback capabilities), wireless email client, or other client, machine or device to perform various tasks including Web browsing, search, electronic mail (email) and other tasks, applications and functions. Client 102 may additionally be any portable media device such as digital still camera devices, digital video cameras (with or without still image capture functionality), media players such as personal music players and personal video players, and any other portable media device. Client 102 can be used by any user or third-party.

Content manager 104, search service 108, and publisher 116 can include a server including, for instance, a workstation running the Microsoft Windows®, MacOS™, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform. In an embodiment, the content manager is a contextual advertisement system that is used to manager content and information related to contextual advertisements. In an embodiment, search service the search service is a search engine. As shown in FIG. 1, content manager 104 and search service 108 are separate devices, however, in other embodiments, the content manager and search service can be integrated into one device. In another embodiment, client 102 may also be a server.

Client 102 can include a communication interface. The communication interface may be an interface that can allow the client to be directly connected to any other client, server, or device or allows the client 102 to be connected to a client, server, or device over network 106. Network 106 can include, for example, a local area network (LAN), a wide area network (WAN), or the Internet. In an embodiment, the client 102 can be connected to another client, device, or server via a wireless interface.

Figure 2:
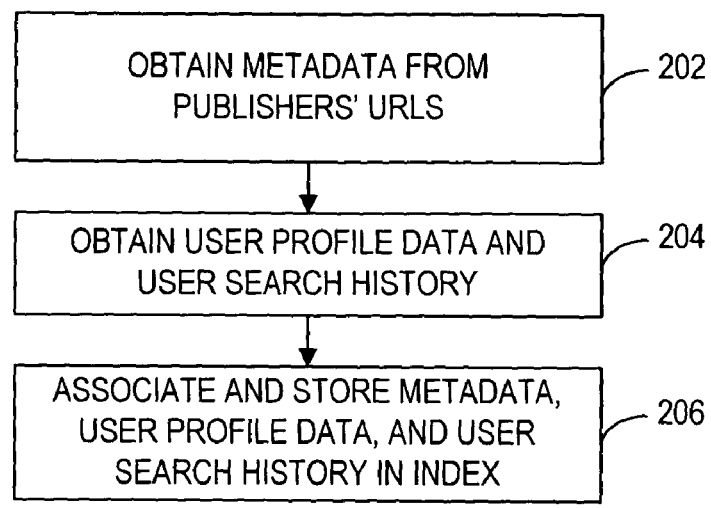
FIG. 2 illustrates an embodiment for creating an index of associated information including metadata from publishers' web pages, user profile data of registered users, and the search history of the registered users.

FIG. 2 illustrates an embodiment for creating an index of associated information including metadata from publishers' web pages, user profile data of registered users, and the search history of the registered users. In an embodiment, a publisher 116 (FIG. 1) can be any website that registers with the content manager in order to have advertisements placed on its web pages. In an embodiment, a publisher can register with the content manager by submitting their primary uniform resource locators (URLs) to the content manager. Once the publisher has registered with the content manager, the content manager can activate a crawler that will crawl any documents from the submitted URLs and as well as any documents from URLs linked to the submitted URLs within the publishers' domains. In an embodiment, a document can be a web page. In crawling the documents of the URLs, at operation 202, any metadata, image data, multimedia data, text data, and any other information can be obtained from the corresponding documents. The obtained information can be stored in index 114 (FIG. 1).

At operation 204, user profile data and the search history of the registered users can be obtained. In an embodiment, registered users are users who have registered with any properties of the search service 108 or content manager 104 (FIG. 1). When registering with any properties of the search service or content manager, a registered user can provide any type of demographic attributes including, but not limited to, age, gender, country and/or city of residence, occupation, interests, income, etc. Such demographic attributes can be stored and obtained from user profile database 110 (FIG. 1). In another embodiment, user profile database 110 may also be stored in the content manager.

The searching service can monitor and track the searching history of registered users through use of a conventional means such as, but not limited to, using cookies. In an embodiment the search history can include the documents accessed by registered users, the search queries used by registered users, as well as the particular method a registered user employed when accessing a document or searching the Internet at any given moment. In an embodiment, accessing a document can include browsing a web page. The search history of registered users can be stored and obtained from search log 112 (FIG. 1).

In an embodiment, demographic attributes can also be obtained from a publisher. A publisher, through use of a conventional means such as, but not limited to, using a cookie, can monitor and track the users that have accessed any of its documents. Such users can be users who have registered with the a property of the searching service or content manager. In an embodiment, a publisher will be issued a cookie from the content manager, the search service, or any other entity in order to monitor the registered users who access any of its documents. With the cookie, if a registered user access a publisher's document, the publisher will be able to attain the demographic attributes of the user. The publisher can then store the demographic attributes of the users who have accessed its documents in user profile database 118 (FIG. 1). The demographic attributes can subsequently be obtained from user profile database 118 at operation 204.

At operation 206, the data crawled and obtained from the publishers' submitted URLs, the user profile information, the user search history information, and any other desired information can be associated together and stored in index 114 (FIG. 1). Associating the information in the index can include associating each user's demographic attributes with the search queries they submitted and the documents that they have accessed while on the Internet. In the event that a user accesses documents that have been crawled from a publisher's URL, the user's demographic information can be associated with the crawled information within the index. In an embodiment, only documents from publishers and the search history related to publishers will be associated and stored with the demographic attributes of registered users.

Figure 3:
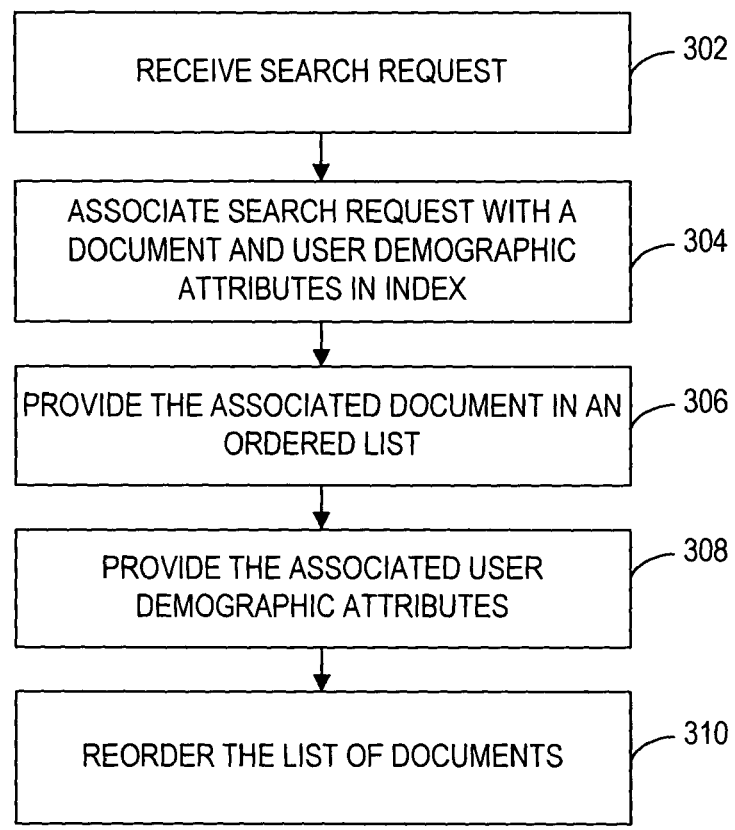
FIG. 3 illustrates an embodiment of a method for providing a document and user demographic attributes corresponding to a search request.

FIG. 3 illustrates an embodiment of a method for providing a document and user demographic attributes corresponding to a search request. At operation 302, a search request is received. In an embodiment, the search request is a demographic search query that includes one or more demographic attributes. In another embodiment, the search request includes a search query with one or more keywords. In such an embodiment, the keywords can be non-demographic keywords that are not related to demographic information.

At operation 304, the search request is associated with the user demographic attributes and the search history data in the index 114 (FIG. 1) that was created in the method of FIG. 2. In an embodiment wherein the search request is a demographic search query, the demographic attributes of the demographic search query can be compared to the demographic attributes of the registered users stored in the index. In the comparison, registered users with similar demographic attributes to those in the demographic search query can be identified along with the documents that these users have accessed. At step 306, the documents accessed by the identified users are provided.

In an embodiment wherein the search request is a search query that includes one or more keywords, the keywords can be compared to search queries stored in index 114 (FIG. 1) that have been submitted by registered users. The keywords can also be compared to the crawled information that was obtained from the publishers' URLs. In the comparison, documents can be identified that are related to the keywords from the search query. For example, in an embodiment in which the documents are web pages, the web pages that are related to the keywords in the received search query can be identified. At operation 306, the identified documents are provided. Additionally, in the embodiment in which the search request is a search query including keywords, demographic attributes associated with the identified documents can also be provided at operation 308. For example, the demographic attributes of the registered users who have accessed the identified documents can be provided. Additionally, the demographic attributes of the registered users who have submitted search queries similar to the keywords in the search request may also be provided.

When the identified documents are provided, the documents can be arranged in an ordered list of results. The documents can be arranged in any type of order that is determined by the content manager or the search service. In an embodiment, the identified documents can be arranged in list based on popularity of the documents. For example, in an embodiment in which the documents are web pages, the identified web pages can be provided in an ascending/descending ordered list of popularity. The level of popularity that each web page receives can be based on any type of algorithm that is determined by the content manager, the search service, or any third party. For example, a web page's level of popularity can be based on the number of users that have visited the web page.

In another embodiment, if the search request received is a search query including one or more keywords, the identified documents can be arranged in an ascending/descending ordered list of relevance to the keywords. For example, the document that is the most relevant to the keywords can be provided first in the list of results followed by a descending order of search results with respective relevance levels to the keywords. The level of relevance that each document receives can be based on any type of algorithm that can be determined by the content manager or the search service.

Once the ordered list of identified documents is provided, at operation 310, the list of documents may be subsequently reordered. In an embodiment, an user interface (UI) is provided to display the list of identified documents to a user. An icon, symbol, hyperlink, switch, or any other trigger mechanism may be provided within the UI that when accessed triggers the UI to display a reordered list of the identified documents based on another order preference. For example, the list of identified documents originally may be provided in an ordered list based on a level of relevance to the keywords within the search query. A user may subsequently access a trigger mechanism that triggers the UI to display a reordered the list of the identified documents based on the popularity of the documents.

In an embodiment, a search request can include both a demographic search query and a search query with one or more keywords. For example, a search request including a one or more keywords may be received along with a demographic search query. The search request can provide documents that are both related to the keywords and that are accessed by those registered users with demographic attributes corresponding to the demographic search query. In another embodiment, a demographic search query can be used to refine a search results list of documents related to a search request including keywords, and vice versa. For example, a first search request including keywords can produce a first results list of documents. Subsequently, a second search request including a demographic search query can be received that produces a second results list that filters out those documents from the first results list that have been accessed by registered users with demographic attributes corresponding to the demographic search query.

Figure 4:
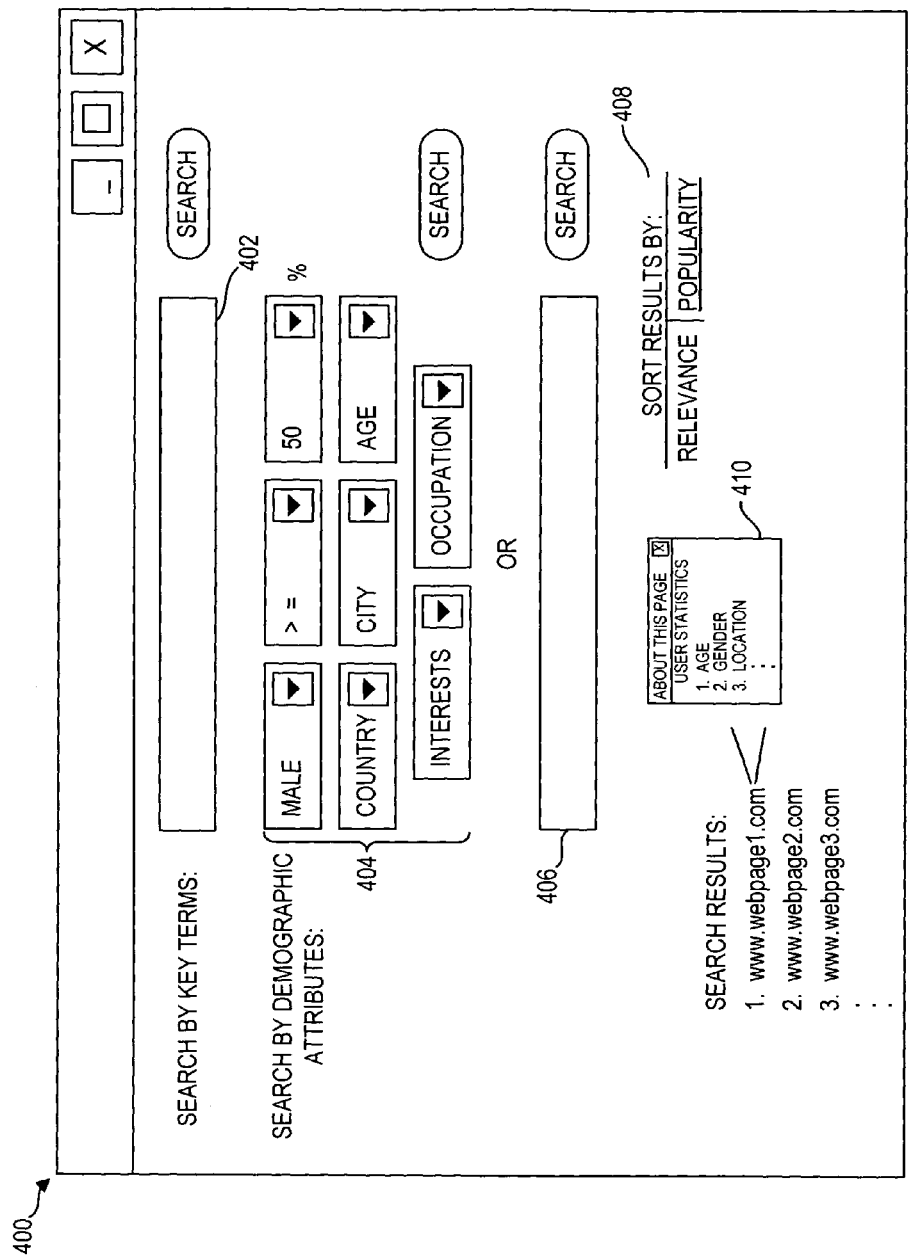
FIG. 4 illustrates an embodiment of an UI for accepting search requests and providing search results.

FIG. 4 illustrates an embodiment of an UI 400 for accepting search requests and providing search results. Using input field 402, a user can input any number of keywords as a search request in order to search for corresponding documents. Using input fields 404 and 406, a user can input demographic attributes in order to search for corresponding documents. Input field 404 represents a structured format for inputting demographic attributes. The structured format includes any number of predefined identifiers that a user can select in order to create a demographic search query. Input field 406 represents an unstructured format for inputting demographic attributes. The unstructured format can be configured to allow a user to freely enter any text related to any type of demographic attribute.

Trigger mechanism 408 allows a user to toggle between two or more search result ordering preferences. In the example shown in FIG. 4, a user is able to display search results ordered by relevance or by popularity. Trigger mechanism 408 can be accessed by any conventional methods including selecting the mechanism with a mouse cursor. Demographic statistic region 410 can be used to provide any type of demographic statistics corresponding to a document identified in the search results list. The statistic region 410 can include textual information as well as graphical information. The demographic region can be a pop-up window, a side-pane window (left or right), a top-pane window, or a bottom-pane window.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

We claim:

1. A method for providing web pages associated with demographic attributes to an advertiser for the placement of advertisements on the web pages, the method comprising:

receiving, from the advertiser, a demographic search request that includes a demographic-attribute-search term and a keyword search term;

identifying a first set of web pages from an index of web pages that have been accessed by one or more registered users of a search service, the web pages in the index being stored in association with keywords used by the registered users in a search query to identify the web pages and in association with demographic attributes of the registered users;

obtaining demographic attributes for the identified registered users from an index;

comparing, by a computing device having a processor, the demographic-attribute-search term to the demographic attributes associated with registered users, the demographic attributes being stored in an index in association with web pages that have been accessed by the registered-users;

identifying a subset of the registered users that are associated with at least one demographic attribute that matches the demographic-attribute-search term;

identifying a second set of web pages that have been accessed by the subset of the registered users;

filtering the first set of web pages to produce a third set of web pages that includes only web pages included in both the first and second sets of web pages; and providing an indication of the third set of web pages to the advertiser for the placement of an advertisement associated with the demographic search request in the one or more web pages.

2. The method according to claim 1, wherein the one or more web pages are associated with publishers.

3. The method according to claim 1, wherein the one or more web pages are ordered based on popularity.

4. A method for providing web pages to an advertiser for the placement of advertisements on the web pages, the method comprising:

receiving, from the advertiser, a demographic search request to provide a plurality of web pages to the advertiser, the demographic search request including a keyword search term and a demographic attribute search term, and the plurality of web pages being associated with a keyword and a plurality of demographic attributes of a plurality of registered users;

comparing, by a computing device having a processor, the keyword search term to search queries entered by the plurality of registered users to identify a first set of web pages, the search queries being stored in an index in association with demographic attributes of the plurality of registered users, the registered users being registered at a search service, the search queries having been executed by one or more of the registered users using the keyword, and the search queries also being stored in association with one or more web pages accessed by the plurality of registered users;

obtaining demographic attributes for the identified registered users from an index;

comparing the demographic attribute search term to the demographic attributes of the plurality of registered users stored in the index to identify a second set of web pages that have been accessed by registered users who share at least one demographic attribute with the demographic attribute search term;

identifying a third set of web pages comprising web pages that are both in the first set of web pages and the second set of web pages; and providing the third set of web pages to the advertiser for the placement of an advertisement associated with the demographic search request in the third set of web pages.

5. The method according to claim 4, wherein the third set of web pages are associated with publishers.

6. The method according to claim 4, wherein the third set of web pages are ordered based on popularity.

7. The method according to claim 4, wherein the third set of web pages are ordered based on relevance of the keyword.

8. The method according to claim 4, wherein the third set of web pages are presented in two search result ordering preferences that may be toggled by the advertiser.

* * * * *